Feb. 20, 1934.  E. WENGEL  1,947,541
SAUSAGE MACHINE
Filed Feb. 9, 1931
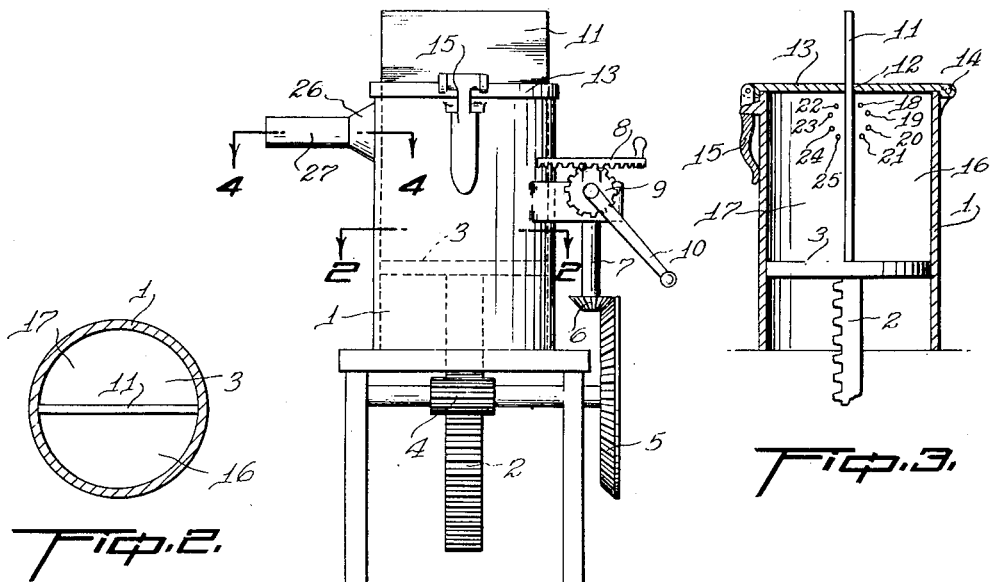
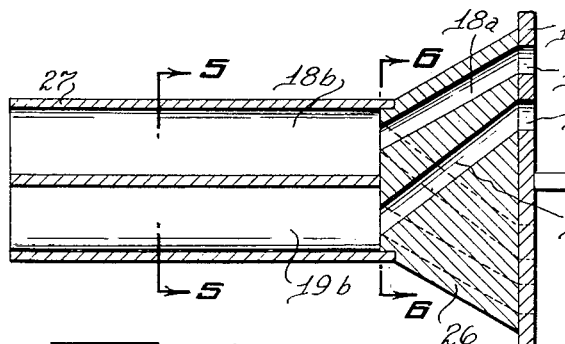
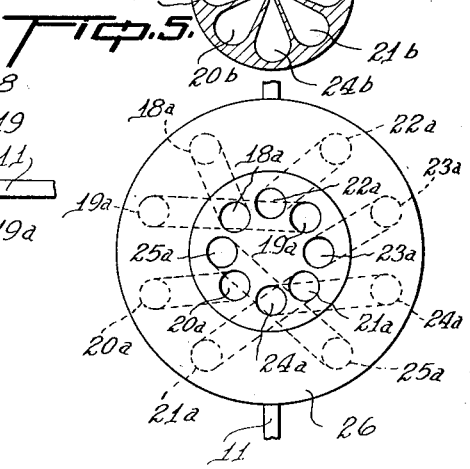
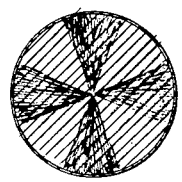
INVENTOR
*Eugene Wengel*
BY
ATTORNEYS Patented Feb. 20, 1934

1,947,541

UNITED STATES PATENT OFFICE 1,947,541

SAUSAGE MACHINE

Eugene Wengel, Detroit, Mich.

Application February 9, 1931. Serial No. 514,486

6 Claims. (Cl. 17—38)

The present invention pertains to a novel sausage machine of a type particularly adapted for making sausages of ornamental cross section.

The primary object of the present invention is to devise a sausage stuffing machine having a container which is divided into two compartments in which are placed meats of contrasting colors. The container is divided by means of a partition which is integrally mounted upon a piston or plunger having suitable gearing for operating the plunger to compress the ground meat against the top cover in which is provided a slot to accommodate the vertical movement of the partition. A plurality of holes are formed in the side wall of the container on each side of said partition adjacent the top of the container and upward movement of said plunger forces the ground meat out through said holes. A die is suitably secured to the side of the container and mounted on the outer face of this die is a nozzle which receives the sausage casing, said nozzle being formed with a plurality of symmetrically arranged passages corresponding in number to the number of holes in the side wall of said container. The die which is positioned between the holes in the container and the passages in the nozzle is formed with passages that are arranged in a manner to carry the dark meat from one side of the partition to every second passage in the nozzle and has passages leading the light meat from the opposite side of the partition to the remaining passages. In this manner the meat delivered through any passages in the nozzle is different from the two passages on either side of it and therefore when it is delivered into the sausage casing it retains the relative position, resulting in various ornamental cross sections in the finished sausage.

With the above and other ends in view the invention consists in matters hereinafter set forth and more particularly pointed out in the appended claims, reference being had to the accompanying drawing in which Figure 1 is a side elevation of a sausage machine equipped with the present die mechanism;

Fig. 2 is a cross sectional view through the meat container, taken substantially on the line 2—2 of Fig. 1;

Fig. 3 is a vertical cross sectional view through the meat container;

Fig. 4 is a longitudinal cross sectional view through the die and nozzle;

Fig. 5 is a transverse cross sectional view through the nozzle, taken on the line 5—5 of Fig. 4;

Fig. 6 is an end view of the die member, taken substantially on the line 6—6 of Fig. 4, and Fig. 7 is a transverse cross sectional view through a sausage, illustrating one of the ornamental appearances that may be attained by employing the present die and nozzle.

Like characters of reference are employed throughout to designate the corresponding parts.

The numeral 1 indicates a cylindrical casing which serves as a container for the ground meat. A rack 2 projects upwardly through the bottom of the casing and has a plunger 3 mounted upon its upper end, the portion below the bottom of the casing meshing with a gear 4 mounted upon a shaft having a gear 5 driven by the gear 6 upon the shaft 7, this latter shaft being equipped with a gear 8 driven by the gear 9 which is mounted integral with a crank 10. It is apparent that rotation of the crank 10 causes the plunger 3 within the container 1 to be raised or lowered.

Mounted integrally upon the top of the plunger 3 is a partition 11 which passes through a slot 12 in the cover 13, the latter being hinged as at 14 to the casing 1 and equipped with a locking means 15 adapted to hold the cover tightly closed. The partition 11 serves to divide the container 1 into two separate compartments 16 and 17, the compartment 16 containing light colored ground meat and the compartment 17 containing dark colored ground meat, the light and dark color merely being suggested by way of example for it will become apparent that any contrasting colors may be employed.

Leading from the compartment 16 are a series of holes 18, 19, 20 and 21 while on the opposite side of the partition 11 and leading from the compartment 17 are a series of holes 22, 23, 24 and 25. A die body 26 is positioned on the outside of said casing wall to cover the above described holes and the die body supports a nozzle 27 having a plurality of symmetrically arranged passages 28 corresponding in number to the number of holes 18 to 25 and it is the purpose of this invention to cause the color of the meat passing through said passages to be alternated in alternating passages. This is attained by providing passages in the die so that the alternating passages 28 receive meat from alternate sides of said partition.

The die is provided with a passage 18a registering with the hole 18 in the casing which carries the light meat from the compartment 16 to the passage 18b in the nozzle. A passage 22a is provided in the die body to register with the hole 22 in the casing and carry the dark meat from the compartment 17 to the passage 22b in the nozzle. The passage 19a in the die carries the light colored meat from the compartment 16 to the passage 19b in the nozzle.

The passages 19a, 20a and 21a register with the holes 19, 20 and 21 respectively, and lead light meat from the compartment 16 to the passages 19b, 20b and 21b, respectively, in the nozzle 27. The passages 23a, 24a and 25a register respectively with the holes 23, 24 and 25 and lead the dark meat from the compartment 17 to the passages 23b, 24b and 25b respectively in the nozzle 27.

The meat is expelled from said passages by upward movement of the plunger 3 and the arrangement of the passages in the die body 26 causes the meat from one of the passages to be dark in color while the two next to it are light, thus alternating the colors to form a sausage having contracting colors in cross section substantially as illustrated in Fig. 7.

The arrangement and shape of the passages in the nozzle result in the various patterns formed by contrasting colors of the meat and it is to be understood that the same die arrangement accommodates nozzles having various arrangements of patterns and it is to be understood that although a specific embodiment of the present invention has been illustrated and described it is to be understood that various changes may be made in the details of construction without departing from the spirit of the invention as set forth in the appended claims, and such changes are contemplated.

What I claim is:

1. A device of the character described comprising a casing having a slotted cover, a reciprocal piston mounted in said casing, a partition mounted on said piston and extending through the slot in said cover, a nozzle supported externally of said casing having a plurality of longitudinally extending passages, and passages communicating with said casing above said piston and alternately leading from opposite sides of the partition in said casing to alternate passages in said nozzle.

2. A sausage machine comprising a cylindrical casing, a reciprocal piston mounted in said casing, a slotted cover hinged to the top of said casing, a partition mounted upon the top of said piston to pass through said slotted cover, a plurality of holes formed on opposite sides of said partition, a die member having passages registering with said holes, and a nozzle having a plurality of passages registering with the passages in said die member.

3. A sausage machine comprising a cylindrical casing, a reciprocal piston mounted in said casing, a partition received in said casing in a manner to permit reciprocal movement of said piston, a plurality of holes formed in said casing on opposite sides of said partition, a die member having passages registering with said holes, and a nozzle having a plurality of passages registering with the passages in said die member.

4. The combination with a partitioned compressor, of a plurality of holes formed on each side of the partition therein, a nozzle having a plurality of symmetrically arranged passages therein, and a die member interposed between said compressor and said nozzle, said die member having a plurality of passages passing through said die in an angular manner and registering with the passages in said nozzle in a manner whereby the holes on opposite sides of the partition communicate with alternate passages in said nozzle.

5. A sausage machine comprising a casing, a piston reciprocally mounted in said casing, a cover on said casing, a partition associated with said piston and said cover and dividing said casing into a plurality of separate compartments and permitting reciprocable movement of said piston, a nozzle supported externally of said casing, and means having passages communicating with said nozzle and said casing at opposite sides of said partition.

6. A sausage machine comprising a casing, a piston reciprocable in said casing, a partition dividing said casing into a plurality of separate compartments and supported to permit reciprocal movement of said piston, a nozzle supported externally of said casing, and means having passages communicating with said nozzle and with said casing on opposite sides of said partition.

EUGENE WENGEL.